United States Patent
Matlock (10) Patent No.: US 10,724,203 B2
(45) Date of Patent: Jul. 28, 2020

(54) FOUNDATION PILE FOR A WIND TURBINE

(71) Applicant: INNOGY SE, Essen (DE)

(72) Inventor: Benjamin Matlock, Hamburg (DE)

(73) Assignee: INNOGY SE, Essen (DE)

( * ) Notice: Subject to any disclaimer, the term of this patent is extended or adjusted under 35 U.S.C. 154(b) by 0 days.

(21) Appl. No.: 16/079,976

(22) PCT Filed: Feb. 28, 2017

(86) PCT No.: PCT/EP2017/054666
§ 371 (c)(1),
(2) Date: Aug. 24, 2018

(87) PCT Pub. No.: WO2017/148961
PCT Pub. Date: Sep. 8, 2017

(65) Prior Publication Data
US 2019/0063030 A1    Feb. 28, 2019

(30) Foreign Application Priority Data

Feb. 29, 2016  (DE) .................... 10 2016 203 267

(51) Int. Cl.
*E02D 27/42* (2006.01)
*E02D 5/28* (2006.01)
(Continued)

(52) U.S. Cl.
CPC .......... *E02D 27/425* (2013.01); *E02D 5/285* (2013.01); *F03D 13/22* (2016.05); *B23K 31/027* (2013.01);
(Continued)

(58) Field of Classification Search
CPC .. E02D 5/28; E02D 5/285; E02D 5/30; E02D 5/52; E02D 5/523; E02D 5/526; E02D 27/42; E02D 27/425
(Continued)

(56) References Cited

U.S. PATENT DOCUMENTS 1,924,346 A  *  8/1933  Blumenthal .............. E02D 5/28
                                                        405/232
4,067,198 A  *  1/1978  Long ..................... E02D 3/115
                                                        405/130
(Continued)

FOREIGN PATENT DOCUMENTS

DE           1345282 U      7/1935
DE      202010011625 U1    12/2010
(Continued)

OTHER PUBLICATIONS

International Preliminary Report on Patentability dated Jun. 13, 2018 in International Application No. PCT/EP2017/054666, filed on Feb. 28, 2017.
(Continued)

*Primary Examiner* — Frederick L Lagman
(74) *Attorney, Agent, or Firm* — Wiley Rein LLP (57) ABSTRACT

The invention relates to a foundation pile comprising a stabilization device that is located within the foundation pile and is connected to at least two inner surface sections of the foundation pile; the stabilization device allows compressive and/or tensile forces to be transmitted such that the stabilization device counteracts lateral deformation and/or torsional deformation of the foundation pile.

12 Claims, 7 Drawing Sheets

(51) Int. Cl.
*F03D 13/20* (2016.01)
*B23K 101/04* (2006.01)
*B23K 31/02* (2006.01)

(52) U.S. Cl.
CPC .. *B23K 2101/04* (2018.08); *E02D 2300/0029* (2013.01); *E02D 2300/0068* (2013.01); *E02D 2600/40* (2013.01); *F05B 2240/91* (2013.01)

(58) Field of Classification Search
USPC .................................................. 405/239, 249
See application file for complete search history.

(56) References Cited

U.S. PATENT DOCUMENTS

| | | | | |
|---|---|---|---|---|
| 4,627,211 | A * | 12/1986 | Foster, Jr. ................. | E04C 5/20 |
| | | | | 405/239 |
| 5,401,122 | A * | 3/1995 | Pate, Jr. .................. | E02D 17/08 |
| | | | | 405/133 |
| 6,254,314 | B1 * | 7/2001 | Park .......................... | E02D 5/28 |
| | | | | 403/383 |
| 7,416,367 | B2 * | 8/2008 | St. Onge ................... | E02D 5/74 |
| | | | | 405/229 |
| 2004/0091346 | A1 | 5/2004 | Wobben | |
| 2006/0127187 | A1 * | 6/2006 | Raines .................... | B63B 21/27 |
| | | | | 405/226 |
| 2010/0232878 | A1 * | 9/2010 | Feygin .................... | E02D 19/04 |
| | | | | 405/14 |
| 2010/0281818 | A1 * | 11/2010 | Southworth ............ | E02D 27/42 |
| | | | | 52/745.17 |
| 2012/0087741 | A1 * | 4/2012 | Desmeules ............. | E02D 5/285 |
| | | | | 405/251 |
| 2015/0337517 | A1 * | 11/2015 | Hall ........................ | E02B 17/02 |
| | | | | 405/227 |
| 2015/0376857 | A1 | 12/2015 | Clifton | |

FOREIGN PATENT DOCUMENTS

| | | | | |
|---|---|---|---|---|
| FR | 2227751 | A5 | 11/1974 | |
| JP | S57119019 | A | 7/1982 | |
| JP | H09250256 | A | 9/1997 | |
| KR | 2017000197 | * | 1/2017 | |
| KR | 1739234 | * | 5/2017 | |
| WO | WO-0216701 A1 | * | 2/2002 | ............. E02D 5/285 |
| WO | WO-2015061862 A1 | * | 5/2015 | ............. E02D 27/42 |

OTHER PUBLICATIONS

International Search Report and Written Opinion dated May 4, 2017 in International Application No. PCT/EP2017/054666, filed on Feb. 28, 2017.

Written Opinion dated Mar. 9, 2018 in International Application No. PCT/EP2017/054666, filed Feb. 28, 2017.

International Preliminary Report on Patentability dated Jun. 13, 2018 in International Application No. PCT/EP2017/054666, filed Feb. 28, 2018.

* cited by examiner

FOUNDATION PILE FOR A WIND TURBINE

RELATED APPLICATIONS

This Application is a § 371 National Stage Application of PCT/EP2017/054666, filed Feb. 28, 2017, which claims priority benefit of German Patent Application No. 102016203267.4, filed Feb. 29, 2016, which applications are incorporated entirely by reference herein for all purposes.

BACKGROUND ART

Foundation piles are generally constructed from cylindrical foundation pile segments arranged one on top of the other and connected to one another. The foundation pile segments, in turn, are made up of one, two or more partial-cylinder segments, each produced from a bent steel plate.

When a foundation pile segment is produced from just one single partial-cylinder segment, the steel plate is bent along the longitudinal extent thereof in such a way that the longitudinal edges (edges of the material or plate), which lie opposite one another in the bent state, can be welded to one another. Welding of the mutually opposite longitudinal edges is accomplished by means of a longitudinal weld seam.

When a foundation pile segment is produced from two or more partial-cylinder segments, the partial-cylinder segments are each connected to one another at the longitudinal edges by means of longitudinal weld seams. In this case, a number of longitudinal weld seams corresponding to the number of partial-cylinder segments is required to connect the partial-cylinder segments.

The foundation pile is then assembled from a multiplicity of correspondingly formed foundation pile segments by connecting mutually adjoining foundation pile segments by means of respective circular weld seams in such a way that the respective longitudinal axes of the foundation pile segments extend in a collinear manner relative to one another.

To produce a corresponding foundation pile, therefore, a large number of weld seams with a large total length is required, making the production of the foundation pile complex and expensive. Thus, for example, to produce two foundation pile segments, each having a height of 3 m and a diameter of 7 m, and for the connection thereof, weld seams with a total length of 28 m are required, namely two times 3 m of longitudinal weld seam in each case to connect the mutually opposite lateral edges or edges of the material of the individual partial-cylinder segments and 22 m of circular weld seam to connect the two foundation pile segments.

In the case of foundation piles which are anchored in the seabed, diameters of 7 m (seven meters) and more are currently customary or desired. To ensure that a foundation pile has sufficient stability to withstand forces exerted on said pile by wind and water movements, the wall thickness of the foundation pile must be increased. In addition, there is the problem that, the larger the diameter of a foundation pile, the less effect enlarging the wall thickness has on the stability thereof. In the case of foundation piles with ever-larger diameters, therefore, the wall thicknesses must increase in a disproportionate way relative to the diameter thereof.

However, large wall thicknesses lead to considerable extra work and considerable additional costs in the production of a foundation pile. Bending a steel plate to form a partial-cylinder segment becomes ever more laborious with increasing wall thickness. Moreover, welding partial-cylinder segments together to form a foundation pile segment and welding the foundation pile segments together to form a foundation pile is technically ever more complex and hence also more expensive as the wall thickness increases.

SUMMARY OF THE INVENTION

It is the underlying object of the invention to provide a foundation pile which has increased stability and can be produced in a simpler and less expensive way, despite increased stability.

The object underlying the invention is achieved by a foundation pile having the features of claim 1. Advantageous embodiments of the foundation pile according to the invention are described in the dependent claims.

To be more precise, the object underlying the invention is achieved by a foundation pile which comprises a stabilization device that is arranged within the foundation pile and is connected to at least two inner surface sections of the foundation pile, wherein compressive and/or tensile forces can be transmitted by means of the stabilization device, such that the stabilization device counteracts lateral de-formation and/or torsional deformation of the foundation pile.

By means of the stabilization device arranged within the foundation pile and connected to inner surface sections of the foundation pile, forces exerted on one side of the foundation pile by the action of wind, the action of waves or the action of tidal flows, for example, are distributed within the foundation pile by means of the stabilization device. Thus, the foundation pile according to the invention has increased lateral stiffness and increased torsional stiffness. It is therefore possible to considerably reduce the wall thickness of the foundation pile according to the invention in achieving a lateral stiffness (lateral bending strength) and/or torsional stiffness of said pile since, in the case of the foundation pile according to the invention, the lateral stiffness and torsional stiffness thereof are considerably increased by means of the stabilization device, with the result that the stiffness of the foundation pile according to the invention is not solely determined by the external geometry and wall thickness thereof. By virtue of the smaller wall thickness of the foundation pile, it is possible to use steel plates with a smaller wall thickness to produce it, thus considerably reducing the effort required to bend it and to weld the partial-cylinder segments into foundation pile segments and to weld the foundation pile segments into the foundation pile. The foundation pile according to the invention thus has reduced production costs. Furthermore, the reduced wall thickness of the foundation pile according to the invention means that said pile has a considerably reduced weight, thereby significantly simplifying the transportation of the partial-cylinder segments or of the foundation pile segments to the erection site of the foundation pile.

A lateral deformation of the foundation pile should be taken to mean a deformation which is directed transversely to the longitudinal axis of the foundation pile. A lateral deformation is caused by lateral forces which are exerted on the foundation pile. Lateral forces should be taken to mean forces exerted on the foundation pile which have a component of the direction of action which is perpendicular to the longitudinal axis of the foundation pile. These lateral forces can be caused by winds or water flows acting on the foundation pile.

Since compressive and/or tensile forces can be transmitted by means of the stabilization device, compressive and/or tensile forces are transmissible by means of the stabilization device from a first inner surface section, which is connected to the stabilization device, to a second inner surface section, which is likewise connected to the stabilization device.

The stabilization device can also be referred to as a stabilization structure, stabilization means, reinforcing structure, compression strut, tension strut or compression and/or tension strut.

In this case, the inner surface sections of the foundation pile can preferably be arranged opposite one another. That is to say that, in a plan view of the foundation pile or of the foundation pile segment (and thus in a plan view of an end edge of the foundation pile or of the foundation pile segment), the inner surface sections to which the stabilization device is connected are at an angular spacing of 180°. However, it is also possible for the inner surface sections to be at an angular spacing which differs from 180°, e.g. between 90° and 120°, or between 120° and 150°, or between 150° and 180°. In general, the inner surface sections to which the stabilization device is connected must be at an angular spacing with respect to one another.

The stabilization device is preferably formed from a non-corroding material, e.g. from steel and/or from carbon fiber-reinforced plastic.

The stabilization device preferably comprises at least one stabilization ring, which is arranged within the foundation pile and is connected to at least two inner surface sections of the foundation pile.

The stabilization ring preferably has a rectangular cross-sectional geometry. As a further preference, the cross section of the stabilization ring is of T-shaped design. As a further preference, the cross section of the stabilization ring is of double-T-shaped design. As a further preference, the stabilization ring is connected to an inner surface of the foundation pile over the entire outer circumference of said ring. The stabilization ring is preferably welded to the inner surface of the foundation pile. The stabilization ring preferably covers an angle of 360°.

The stabilization device preferably comprises at least one stabilization strut, the two ends of which are connected to the two inner surface sections of the foundation pile.

A correspondingly designed foundation pile is of particularly simple structural design, and therefore the production costs for the correspondingly designed foundation pile are also particularly low. Despite a simple design of the stabilization device as a stabilization strut, the foundation pile has increased lateral stiffness (bending strength) and increased torsional stiffness.

The stabilization strut can be of straight design or can be designed with a bend. By means of a straight stabilization strut, compressive and/or tensile forces can be transmitted in a particularly effective way. In the case of a stabilization strut which has a bend, the interior of the foundation pile can be used in a particularly effective way since the stabilization strut can adapt to different structures within the foundation pile, e.g. an elevator and/or a staircase. Moreover, the stabilization device can be used to accommodate and guide cables within the foundation pile.

The inner surface sections of the foundation pile to which the stabilization strut is connected are preferably arranged opposite one another.

However, it is also possible for the stabilization strut to follow the inner radius of the foundation pile and, consequently, to extend parallel to an inner wall of the foundation pile, at least in some section or sections.

The stabilization device preferably comprises at least two stabilization struts, the components of extent of which do not extend parallel to one another, at least in some section or sections. In this case, the respective ends of the stabilization struts are each connected to one inner surface section of the foundation pile.

A foundation pile of corresponding design has further increased lateral stiffness and torsional stiffness. Particularly if the two stabilization struts are at an angle of 90°, forces exerted on the foundation pile from any direction can be distributed in a particularly advantageous manner within the foundation pile. This further increases the bending stiffness and torsional stiffness of the foundation pile.

The components of extent of the at least two stabilization struts thus define a plane. Here, the stabilization struts preferably extend perpendicularly to one another. However, it is also possible for the stabilization struts to enclose any desired angle relative to one another.

For example, the stabilization struts can each be of straight design. However, the stabilization struts can also each have a bend. In particular, the stabilization struts can follow the inner wall/the inner radius of the foundation pile.

The stabilization device preferably comprises at least three stabilization struts, respective pairs of the components of extent of which do not extend parallel to one another. The respective ends of the stabilization struts are each connected to one inner surface section of the foundation pile.

The components of extent of the stabilization struts thus define a space. That is to say that the stabilization device has components of extent which are oriented in all spatial directions. In the installed position of the foundation pile, for example, when said pile is therefore anchored in the foundation and the longitudinal axis thereof is preferably oriented parallel to the direction of gravity, two of the stabilization struts extend in one plane, preferably in a horizontal plane, whereas the third stabilization strut projects from this plane and this stabilization strut consequently has a component of extent which is oriented perpendicularly to the plane defined by the other stabilization struts.

A correspondingly designed foundation pile has further increased stiffness since, within the vertical extent of the stabilization device, said device counteracts a lateral deformation of the foundation pile. If, for example, a wave strikes a correspondingly designed foundation pile anchored in the seabed, not only are the lateral forces exerted on the foundation pile by the wave distributed within the foundation pile by means of the stabilization device in the plane of the foundation pile in which the wave strikes the foundation pile, but the lateral forces are also distributed by means of the stabilization device between axially spaced regions of the foundation pile. Consequently, lateral forces exerted on the foundation pile are distributed more uniformly in the foundation pile by means of the stabilization device.

The stabilization device preferably comprises at least four stabilization struts, respective pairs of which do not extend parallel to one another. In this case, a first stabilization strut and a second stabilization strut define a first plane, and a third stabilization strut and a fourth stabilization strut define a second plane, wherein the first plane and the second plane enclose an angle.

Since the first plane and the second plane enclose an angle with one another, they do not extend parallel to one another. Consequently, a foundation pile of corresponding design also has the advantage that lateral forces exerted on the foundation pile are distributed more uniformly in the foundation pile by means of the stabilization device.

In this case, the stabilization struts are preferably arranged in a double-X geometry relative to one another.

The stabilization struts are preferably connected to one another.

By connecting the stabilization struts to one another, both the lateral stiffness and the torsional stiffness of the correspondingly designed foundation pile are further increased. Furthermore, the forces exerted on the foundation pile are distributed more uniformly within the foundation pile. This makes it possible for the wall thickness of the correspondingly designed foundation pile to be reduced further.

The foundation pile is preferably designed in such a way that the stabilization device comprises eight stabilization struts, wherein two stabilization struts in each case extend axially offset and in a collinear manner relative to one another, thus forming four stabilization strut pairs which do not extend parallel to one another. In this case, a first stabilization strut pair and a second stabilization strut pair define a first plane, and a third stabilization strut pair and a fourth stabilization strut pair define a second plane, wherein the first plane encloses an angle with the second plane. The foundation pile furthermore comprises a connecting device for connecting the stabilization struts to one another, wherein the connecting device has eight receptacles for respectively accepting one end of a stabilization strut, wherein the axial extents of two receptacles in each case extend parallel to one another.

Since the first plane and the second plane enclose an angle with one another, they do not extend parallel to one another. Consequently, a correspondingly designed foundation pile also has the advantage that lateral forces exerted on the foundation pile are distributed more uniformly in the foundation pile by means of the stabilization device.

In this case, the stabilization strut pairs are preferably arranged in a double-X geometry relative to one another.

The respective receptacles of the connecting device can, for example, be designed as receiving bushes, into which the ends of the stabilization struts can be inserted.

The foundation pile preferably has at least two foundation pile segments, wherein the longitudinal axes of the respective foundation pile segments extend in a substantially collinear manner relative to one another.

The stabilization device is then preferably connected to the inner surface sections of a foundation pile segment. In a corresponding embodiment, the stabilization device can be introduced into the foundation pile segment and connected to the latter before the foundation pile segment is connected to another foundation pile segment. A corresponding design simplifies the assembly of the foundation pile. According to another possible embodiment, a stabilization device can be connected to two foundation pile segments. For example, one end of the stabilization device can be connected to one foundation pile segment, and the other end of the stabilization device can be connected to an axially adjacent foundation pile segment.

In this case, the foundation pile segments are preferably each formed by at least one partial-cylinder segment. In this case, the partial-cylinder segments are formed by bending a steel plate along the longitudinal extent thereof or along the transverse extent thereof.

The two foundation pile segments are preferably connected to one another by means of the stabilization device.

By means of a corresponding design of the foundation pile, axially adjacent foundation pile segments can support one another. Thus, lateral forces are not transmitted only by the circular weld seams between the foundation pile segments; instead, they are also transmitted by means of the stabilization device from one foundation pile segment to an axially adjacent foundation pile segment. The stability of the foundation pile is thereby further increased.

The foundation pile according to the invention is preferably designed in such a way that the foundation pile segments are each formed by at least two partial-cylinder segments, which are connected to one another by means of the stabilization device.

As a further preference, the foundation pile according to the invention is designed in such a way that longitudinal edges of adjacent partial-cylinder segments of the foundation pile segment are spaced apart, with the result that the foundation pile has through openings between these longitudinal edges of the partial-cylinder segments.

The respective partial-cylinder segments can be connected to one another by means of the stabilization device.

In the correspondingly designed foundation pile, fewer longitudinal weld seams are required to connect the partial-cylinder segments to one another and fewer circular weld seams are required to connect the foundation pile segments to one another. Furthermore, the through openings in the foundation pile reduce the load on the foundation pile due to wind and/or waves since wind and/or waves can enter and leave the foundation pile through the through openings and, consequently, can pass through the foundation pile. Consequently, the correspondingly designed foundation pile offers the advantages that the foundation pile is exposed to reduced lateral forces, the wall thickness of the foundation pile can be reduced, and the total weld seam length for the erection of the foundation pile is reduced.

The foundation pile preferably comprises fastening devices, which are arranged on the inside of the foundation pile, wherein the stabilization device is fastened on the fastening devices.

A correspondingly designed foundation pile offers the ad-vantage that the forces exerted on the inside of the foundation pile by means of the stabilization device are exerted there via a larger surface area on the foundation pile, thus making it possible to reduce the wall thickness of the foundation pile further.

The fastening devices can be implemented in the form of fastening plates, in particular in the form of steel plates. In this case, the fastening devices advantageously follow the inner contour of the foundation pile.

The fastening devices can be welded and/or adhesively bonded to the inner surface/inner surface sections of the foundation pile. Furthermore, the fastening devices can be connected to the inner surface/inner surface sections by means of bolts, screws etc.

The ends of the stabilization device/the stabilization struts can each be connected to one fastening device. In this case, the ends of the stabilization struts can be connected in an articulated manner to the fastening device. For example, the fastening devices can each have a fastening eye, which is connected by means of a bolt or of a screw to an eye provided on the end of a stabilization strut.

BRIEF DESCRIPTION OF THE DRAWINGS

Further advantages, details and features of the invention will become apparent below from the illustrative embodiments explained. In particular:

FIG. 1b: shows a plan view of the foundation pile illustrated in FIG. 1a;

FIG. 1d: shows a plan view of another modification of the foundation pile illustrated in FIG. 1a;

FIG. 2b: shows a plan view of the foundation pile illustrated in FIG. 2a;

FIG. 3: shows a plan view of a foundation pile according to the invention having a stabilization device modified in yet another way;

DETAILED DESCRIPTION OF THE EMBODIMENTS

In the description which now follows, identical reference signs denote identical components or identical features, and therefore a description given in relation to one component with reference to one figure also applies to the other figures, thus avoiding repeated description. Furthermore, individual features which have been described in connection with one embodiment can also be used separately in other embodiments.

Figure 1A:
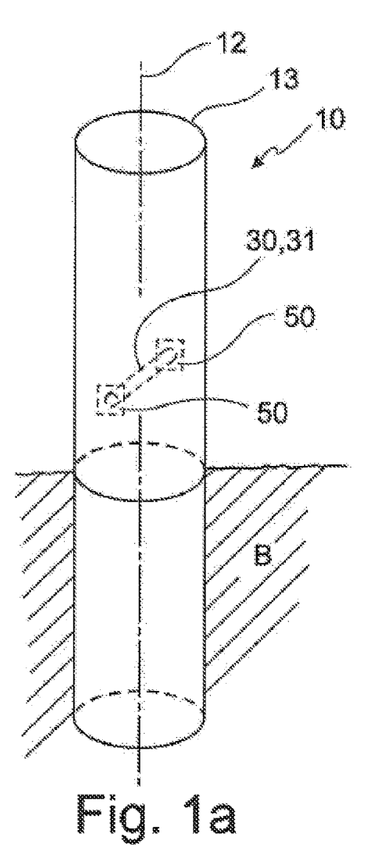
FIG. 1a: shows a schematic and perspective view of a foundation pile according to the invention in accordance with a first embodiment of the present invention.
Figure 1B:
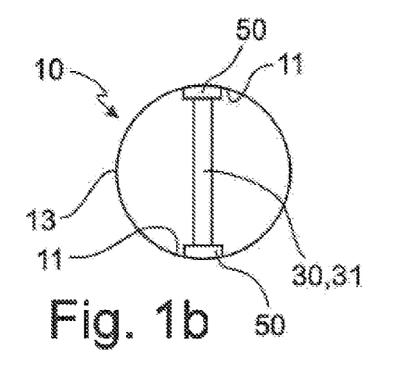

FIG. 1a shows a schematic and perspective view of a foundation pile 10 according to the invention in accordance with a first embodiment of the present invention, and FIG. 1b shows the foundation pile 10 illustrated in FIG. 1a in plain view, that is to say in a plan view of an end edge 13 of the foundation pile 10. The foundation pile 10 is introduced into a foundation B, wherein the foundation B can also be the seabed B. The introduction or driving of the foundation pile 10 into the foundation B can be accomplished by means of impact driving and/or vibration driving. Consequently, a lower part of the foundation pile 10 is anchored in the foundation B, and an upper part of the foundation pile 10 is arranged above the foundation B. A further structure, e.g. a transition piece (not shown) and/or a nacelle (not shown) of a wind turbine, can be fastened on the upper region of the foundation pile 10.

The foundation pile 10 comprises a stabilization device 30, which is designed as a stabilization strut 31 in the illustrative embodiment shown. The stabilization strut 31 is connected to two fastening devices 50, which are fastened on mutually opposite inner surface sections 11 of the foundation pile 10. In the illustrative embodiment shown, the inner surface sections 11 are arranged opposite one another and have an angular spacing of 180°. The stabilization strut 31 is designed to absorb compressive forces and to absorb tensile forces, and therefore the stabilization strut 31 counteracts both lateral deformation and torsional deformation of the foundation pile 10.

Of course, it is also possible for the stabilization device 10 to be designed, for example, as a stabilization rope 10, which is designed to absorb only tensile forces. Even in the case of a corresponding design of the stabilization device 10, this device counteracts lateral and torsional deformation of the foundation pile 10.

By means of the stabilization strut 31 arranged within the foundation pile 10 and connected to the inner surface sections 11 of the foundation pile 10, forces exerted on the foundation pile 10 by the action of wind and/or the action of waves are distributed within the foundation pile 10. Thus, the foundation pile 10 according to the invention has increased lateral stiffness and increased torsional stiffness. For this reason, the wall thickness of the foundation pile 10 can be considerably reduced since the lateral stiffness and torsional stiffness thereof is considerably increased by means of the stabilization device 30. Thus it is not only the external geometry and wall thickness of the foundation pile 10 which are decisive for the lateral stiffness and torsional stiffness of said foundation pile.

The foundation pile 10 is usually made up of a multiplicity of foundation pile segments 20 (see FIGS. 8 and 9), the end edges of which are connected to one another. This connection is usually accomplished by welding. The respective foundation pile segments 20 are produced by bending steel plates, wherein the mutually opposite lateral edges are connected to one another, wherein this connection can also be implemented by welding by means of a longitudinal weld seam or, alternatively, by means of a clamp. However, it is also possible for a foundation pile segment 20 to be produced from two or more partial-cylinder segments (see FIG. 8).

The fastening of the fastening devices 50 to the inner side of the foundation pile 10 can be accomplished by means of adhesive bonding and/or by means of welding and/or by means of screwing the fastening devices 50 to the inner surface sections 11 of the foundation pile 10. In the illustrative embodiment shown, the fastening devices 50 are designed as fastening plates 50. By means of the fastening plates 50, the forces exerted on the inner surface sections 11 of the foundation pile 10 by means of the stabilization strut 31 are distributed over a larger surface area, thereby making it possible to reduce the wall thickness of the foundation pile 10.

Figure 1C:
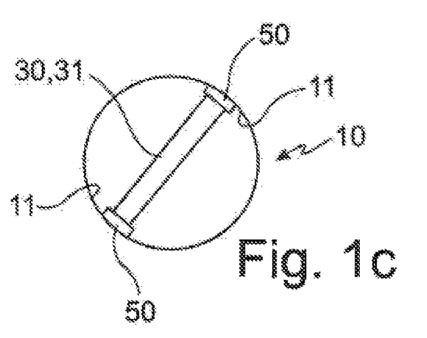
FIG. 1c: shows a plan view of a modification of the foundation pile illustrated in FIG. 1b.

A slightly modified foundation pile 10 in accordance with the first embodiment is illustrated in plain view in FIG. 1c. The foundation pile 10 illustrated in FIG. 1c differs from the foundation pile 10 illustrated in FIGS. 1a and 1b in that the angular spacing between the fastening devices 50 corresponds approximately to 135°. Given appropriate positioning of the fastening plates 50 on the inner surface of the foundation pile 10, an increase in the torsional stiffness and lateral stiffness of the foundation pile 10 is also achieved. Of course, it is also possible for the angular spacing of the fastening devices 50 to assume a different value. It is also within the scope of the invention for the fastening devices 50 not to be arranged in a common horizontal plane in the installed position of the foundation pile 10. The fastening devices 50 can also be spaced apart axially, with the result that the stabilization strut 31 connected to the fastening devices 50 also has a component of extent in the axial direction of the foundation pile 10.

Figure 1D:
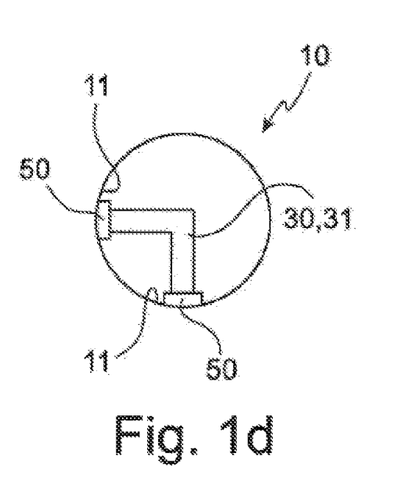

Another modification of the foundation pile 10 in accordance with the first embodiment is illustrated in plain view in FIG. 1d. Here, the angular spacing of the fastening devices 50 is 90°, and the fastening strut 10 is not of straight design but has a bend. However, the rest of the structure of the foundation pile 10 illustrated in FIG. 1d is identical with the structure of the foundation pile 10 illustrated in FIGS. 1a to 1c.

Figure 2A:
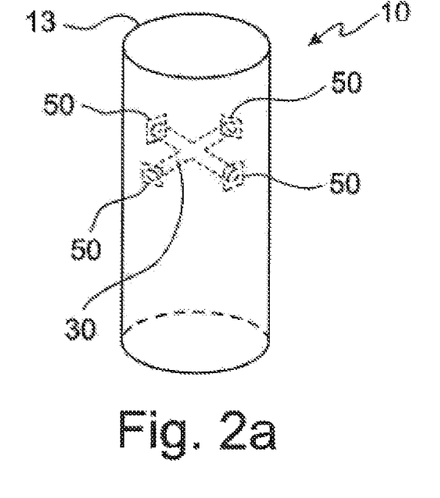
FIG. 2a: shows a schematic and perspective view of a foundation pile according to the invention in accordance with a second embodiment of the present invention.
Figure 2B:
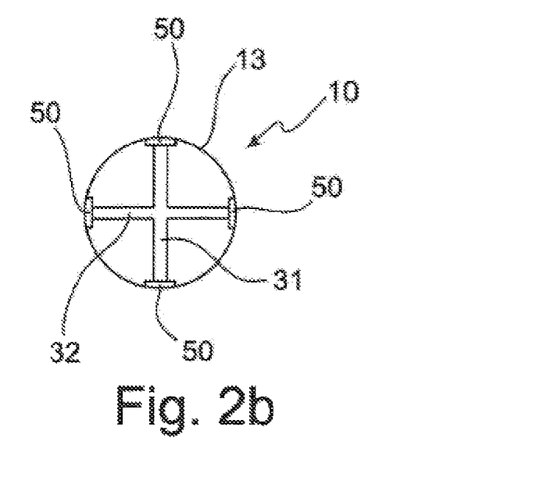

FIG. 2a shows a foundation pile 10 in accordance with a second embodiment of the present invention in perspective illustration, and FIG. 2b shows the foundation pile 10 illustrated in FIG. 2a in plain view. The stabilization device 30 comprises two stabilization struts 31, 32, which are connected to one another in the illustrative embodiment shown. However, it is also possible for the stabilization struts 31, 32 not to be connected to one another. The respective ends of the stabilization struts 31, 32 are connected to four fastening plates 50. In the illustrative embodiment shown, the fastening plates 50 are situated in a common horizontal plane in the installed position of the foundation pile 10. However, the present invention is not restricted to a corresponding arrangement of the stabilization device 30 in the foundation pile 10. It is also possible for the fastening plates 50 to be spaced apart axially, with the result that the stabilization struts 31, 32 then also have components of extent in the axial direction of the foundation pile 10.

Figure 2C:
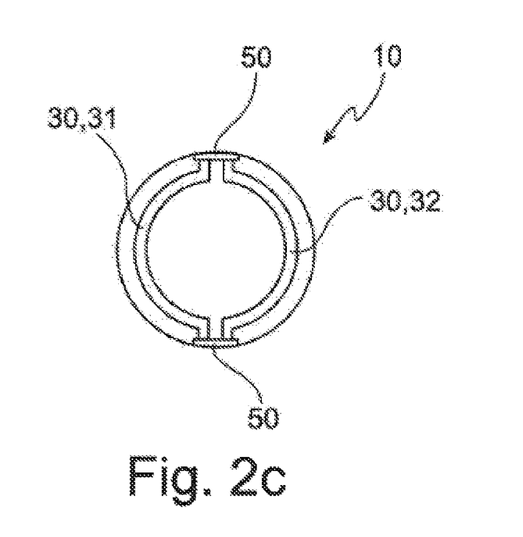
FIG. 2c: shows a plan view of the foundation pile in accordance with the second embodiment having a modified stabilization device.

A modification of the foundation pile 10 in accordance with the second embodiment is illustrated in FIG. 2c. The foundation pile 10 comprises just two fastening devices 50, which are arranged opposite one another. The stabilization struts 31, 32 of the stabilization device 30 furthermore each have a bend and follow the inner surface of the foundation pile 10. It can also be seen that the fastening plates 50 are connected respectively to two ends of the stabilization struts 31, 32. By means of a corresponding design of the stabilization struts 31, 32, it is possible to make better use of the interior region of the foundation pile 10.

Figure 3:
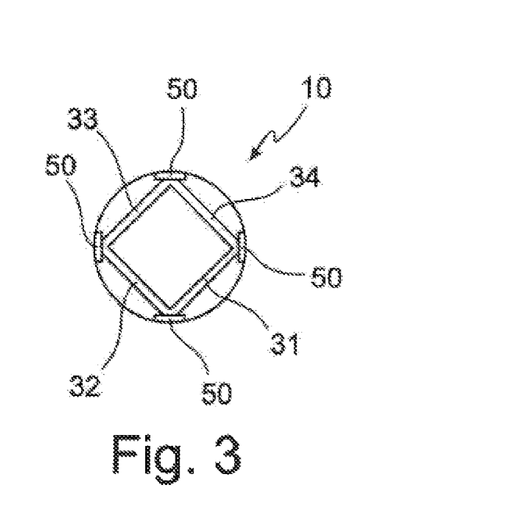
FIG. 3: shows a plan view of a foundation pile according to the invention in accordance with a third embodiment of the present invention.

A foundation pile 10 in accordance with a third embodiment of the present invention is illustrated in plain view in FIG. 3. In the case of this foundation pile 10, the stabilization device has four stabilization struts 31-34, which are connected to the inner wall of the foundation pile 10 by means of four fastening devices 50. The fastening devices 50 each have an angular spacing of 90° with respect to one another, wherein two directly adjacent fastening devices 50 are connected by means of one stabilization strut 31-34 in each case. A relatively large free space in the interior region of the foundation pile 10 is thereby achieved and the pile has increased utility.

Of course, the fastening devices 50 can be spaced apart axially in the installed position of the foundation pile 10, with the result that the fastening struts 31-34 then not only extend in a horizontal plane of the foundation pile 10 but likewise have components of extent which are oriented parallel to the longitudinal axis 12 of the foundation pile 10.

Figure 4:
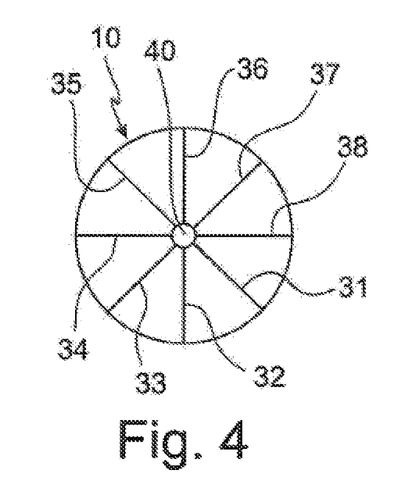
FIG. 4: shows a plan view of a foundation pile according to a fourth embodiment of the present invention.

A foundation pile 10 in accordance with a fourth embodiment is illustrated in plain view in FIG. 4. Here, the stabilization device 30 comprises eight stabilization struts 31-38, the respective ends of which are connected to mutually opposite inner surface sections 11 of the foundation pile 10. From FIG. 4, it can be seen that the respective stabilization struts 31-38 are connected to one another by means of a schematically illustrated connecting device 40.

Figure 5:
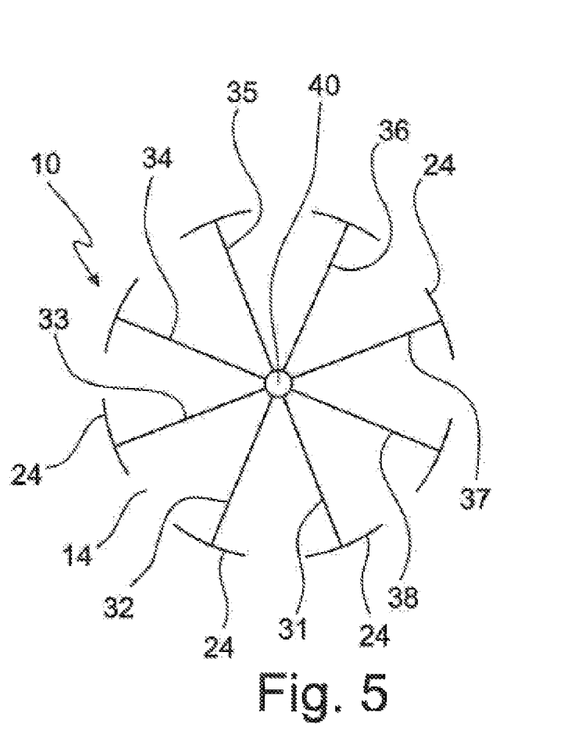
FIG. 5: shows a plan view of a foundation pile according to a fifth embodiment of the present invention.

A foundation pile 10 in accordance with a fifth embodiment is illustrated in plain view in FIG. 5. The foundation pile segment 20 illustrated is made up of eight partial-cylinder segments 24. Here, the respective partial-cylinder segments 24 are connected to one another by means of the stabilization device 30. In the case of the foundation pile 10 illustrated in FIG. 5 too, the respective connection struts 31-38 are connected to one another by means of a connecting device 40. The respective partial-cylinder segments 24 are spaced apart radially, with the result that a through opening 14 in the foundation pile 10 is formed between every two partial-cylinder segments 24. Given a corresponding design of the foundation pile 10, wind and/or waves can enter and leave the foundation pile 10, thus reducing the load on the foundation pile 10.

Figure 6:
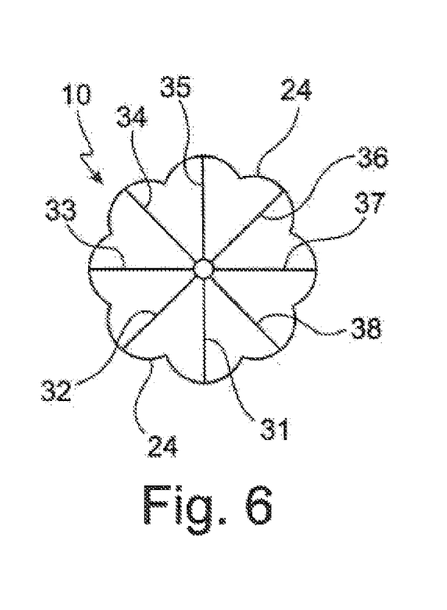
FIG. 6: shows a plan view of a foundation pile according to a sixth embodiment of the present invention.
Figure 7:
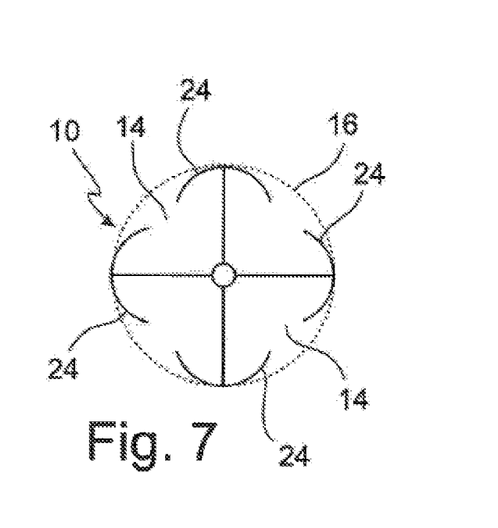
FIG. 7: shows a plan view of a foundation pile according to a seventh embodiment of the present invention.

FIG. 6 shows a foundation pile 10 in accordance with a sixth embodiment in plain view. In the case of the foundation pile 10 in accordance with the sixth embodiment, the respective partial-cylinder segments 24 have a radius of curvature which is smaller than a radius of curvature of the envelope of the foundation pile 10. By means of a corresponding design of the foundation pile 10, said pile has increased lateral stiffness and also increased torsional stiffness. The rest of the structure of the foundation pile 10 illustrated in FIG. 6 is identical with the foundation pile 10 illustrated in FIG. 4.

In the case of the foundation piles 10 illustrated in FIGS. 4, 5 and 6, the stabilization devices 30 each have 8 stabilization struts 31-38. However, it is also possible for the stabilization devices 30 to be designed in such a way that the respectively parallel connection struts 31-38 are each regarded as one connection strut, and therefore the foundation piles 10 illustrated in FIGS. 4 to 6 then each have just four stabilization struts. In the case of all the foundation piles 10 illustrated in FIGS. 4 to 6, the connection points of the stabilization struts 31-38 to the in-side of the foundation pile 10 can be spaced apart axially, with the result that the stabilization device 30 or the stabilization struts 31-38 have components of extent which extend parallel to the longitudinal axis 12 of the foundation pile 10 in the installed position of the foundation pile 10.

Figure 8:
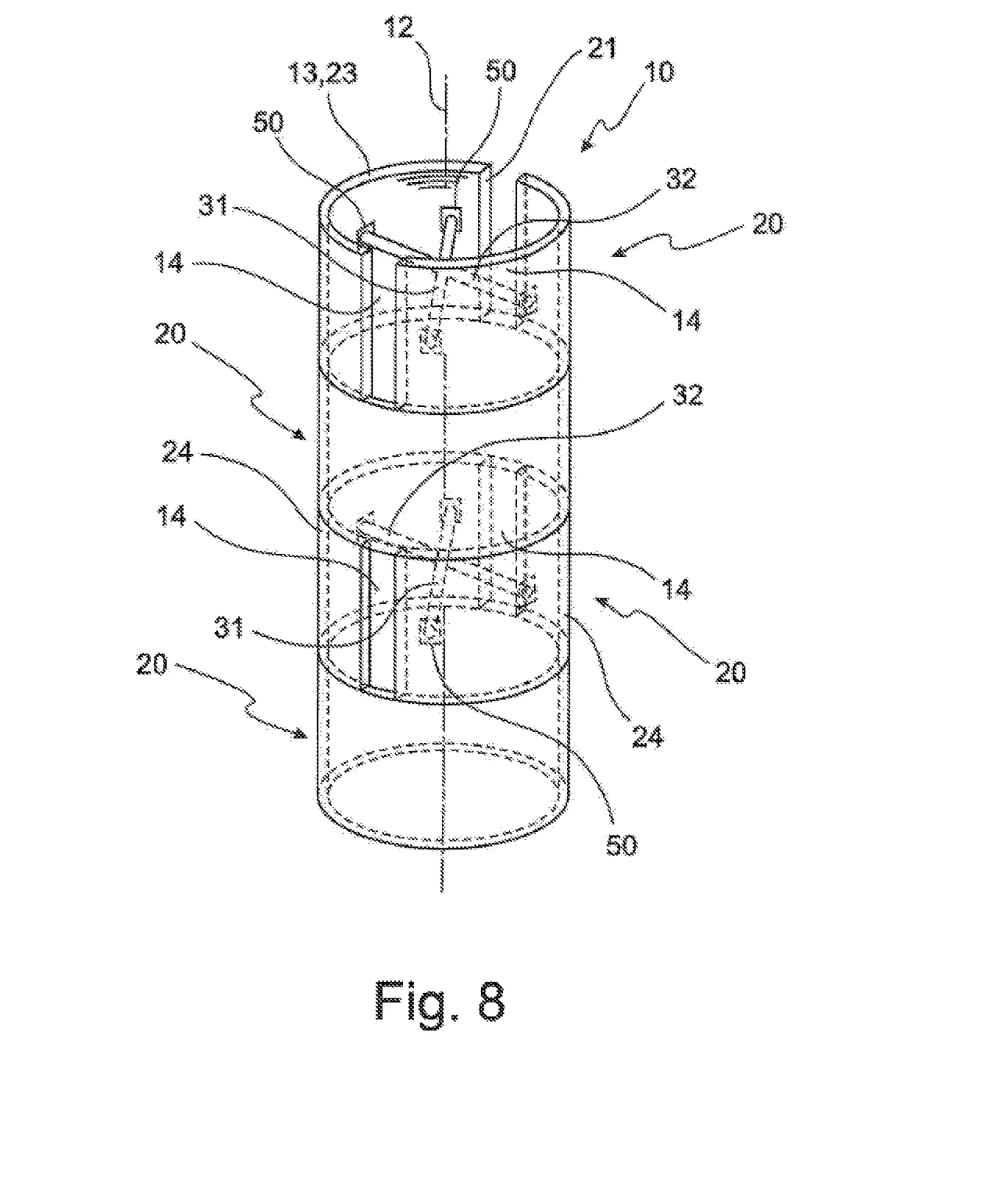
FIG. 8: shows a plan view of a foundation pile according to an eighth embodiment of the present invention.

FIG. 8 shows a foundation pile 10 in accordance with an eighth embodiment of the present invention in a schematic, perspective illustration. The foundation pile 10 is made up of four foundation pile segments 20, with the respective foundation pile segments 20 being connected to one another at the contact edges thereof by means of a circular weld seam. The uppermost foundation pile segment 20 is made up of two partial-cylinder segments 24, which are connected to one another by means of a stabilization device 30. The partial-cylinder segments 14 are spaced apart radially, with the result that through openings 14 in the foundation pile 10 are formed between the longitudinal edges 21 of the respective partial-cylinder segments 24.

In the illustrative embodiment shown, the stabilization device 30 has two stabilization struts, each of the ends of which are connected to one fastening plate 50. In this case, the stabilization struts 31, 32 extend in the horizontal plane in the installed position of the foundation pile 10. However, it is, of course, also possible for the fastening plates 50 to be fastened on the inner surface of the foundation pile 10 in such a way that the stabilization struts 31, 32 have components of extent which extend parallel to the longitudinal axis 12 of the foundation pile 10 in the installed position of the foundation pile 10.

From FIG. 8, it can be seen that foundation pile segments 20 which each have at least one through opening 14 are enclosed axially by foundation pile segments 20 which do not have through openings 14. The foundation pile segments 20, which are made up of at least two partial-cylinder segments 24, are thereby also stabilized by the axially adjacent foundation piles 20 in addition to the stabilization by means of the stabilization device 30.

Figure 9:
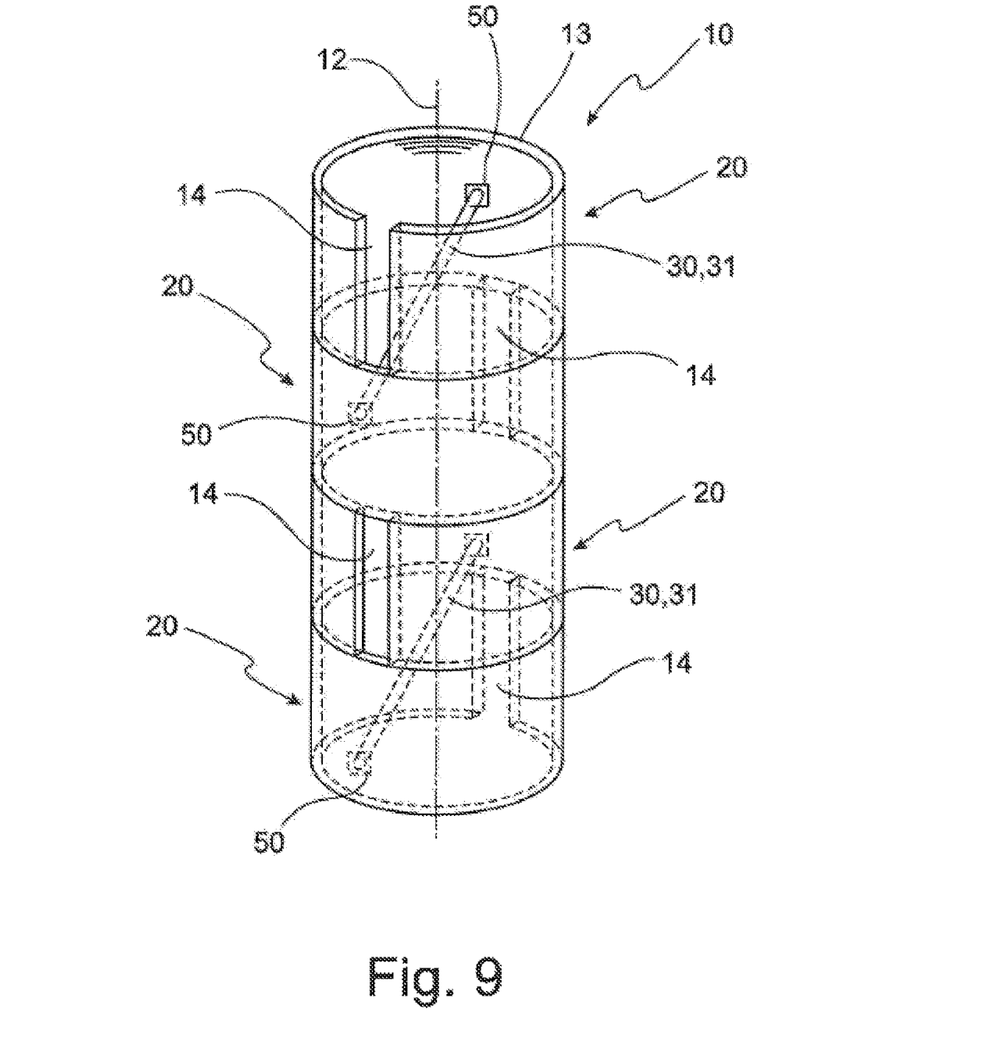
FIG. 9: shows a plan view of a foundation pile according to a ninth embodiment of the present invention.

A foundation pile 10 in accordance with a ninth embodiment is illustrated in FIG. 9. It can be seen that the axially adjacent foundation pile segments 20 are each formed by a partial-cylinder segment 24, wherein longitudinal edges 21 of the respective partial-cylinder segments 24 are spaced apart, with the result that the foundation pile 10 thus formed in each case has through openings 14. The stabilization device 30 connects and stabilizes two axially adjacent foundation pile segments 20. It can furthermore be seen from FIG. 9 that the through openings 14 of axially adjacent foundation pile segments 20 have an angular spacing of 180°.

Figure 10:
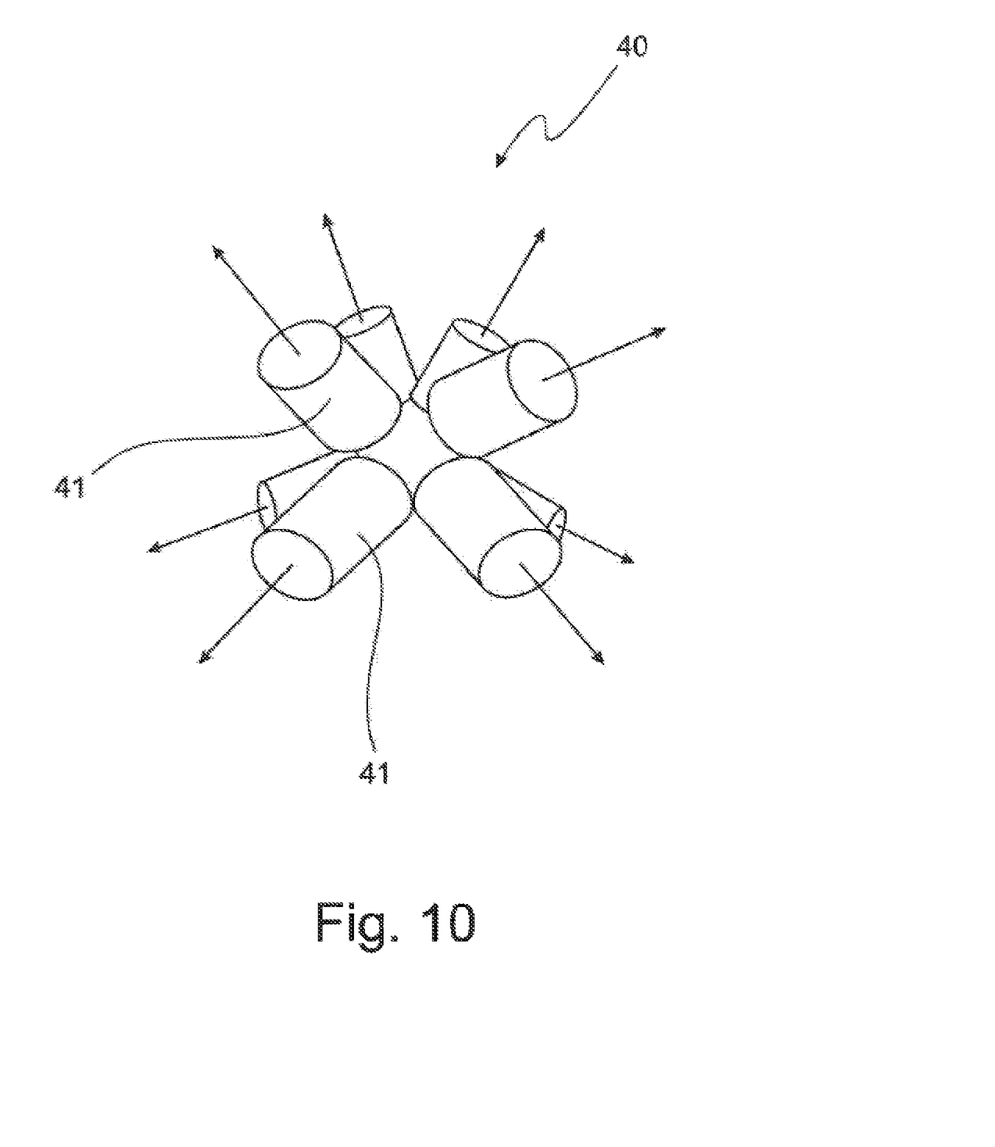
FIG. 10: shows a perspective view of a connecting device for connecting connection struts to one another.

FIG. 10 shows a connecting device 40 for connecting stabilization struts 31-38 to one another. In the illustrative embodiment shown, the connection device 40 has eight receptacles 41 or receiving bushes 41, into which the stabilization struts 31-38 (see FIGS. 4, 5 and 6) can be introduced and connected to the connecting device 40. The arrangement of the receptacles 41 of the connecting device 40 is chosen in such a way geometrically that the stabilization struts 30-38 inserted into the receptacles 41 have a double-X geometry. A corresponding design of the stabilization device 30 offers a particularly high lateral and torsional stiffness for the foundation pile 10.

Figure 11A:
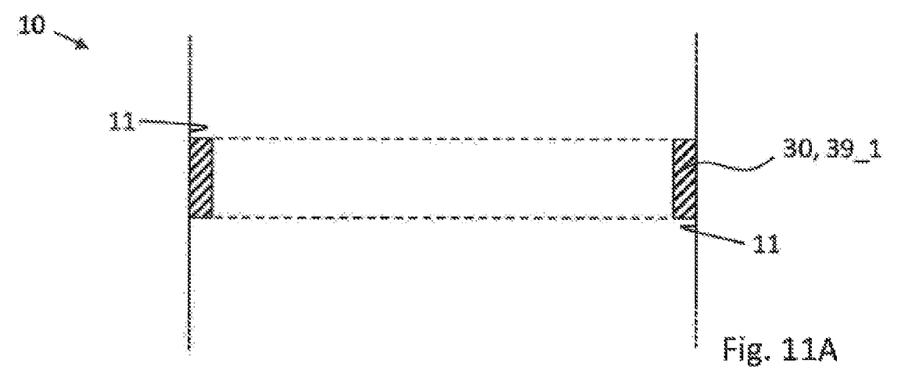
FIG. 11A: shows a schematic cross-sectional illustration of part of a foundation pile according to a tenth embodiment of the present invention, in which the stabilization device is designed as a stabilization ring of rectangular cross section.

FIG. 11A shows a schematic cross-sectional illustration of part of a foundation pile 10 in accordance with a tenth embodiment of the present invention, in which the stabilization device 30 is designed as a stabilization ring 39_1 of rectangular cross section. The stabilization ring 39_1 is connected over the entire outer circumference thereof to the inner surface 11 of the foundation pile 10. The stabilization ring 39_1 covers an angle of 360°.

Figure 11B:
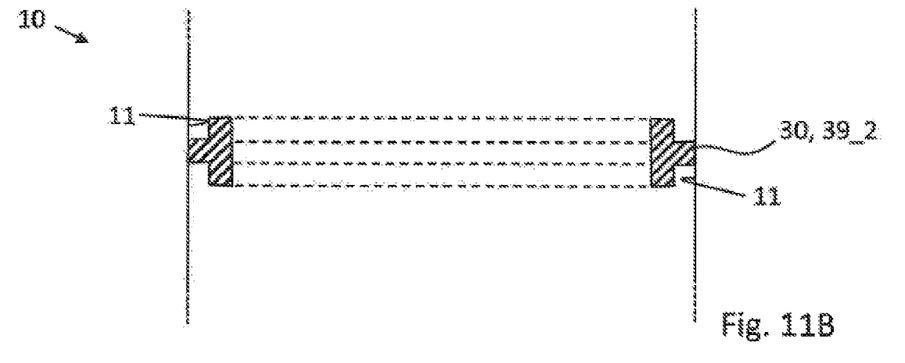
FIG. 11B: shows a schematic cross-sectional illustration of part of the foundation pile according to an eleventh embodiment of the present invention, in which the stabilization device is designed as a stabilization ring of T-shaped cross section.

FIG. 11B shows a schematic cross-sectional illustration of part of a foundation pile 10 in accordance with an eleventh embodiment of the present invention, in which the stabilization device 30 is designed as a stabilization ring 39_2 of T-shaped cross section. Stabilization ring 39_2 is connected over the entire outer circumference thereof to the inner surface 11 of the foundation pile 10. Stabilization ring 39_2 covers an angle of 360°.

Figure 11C:
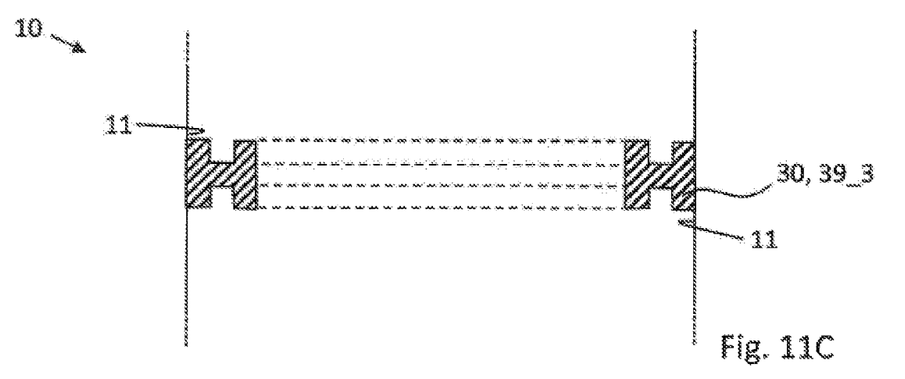
FIG. 11C: shows a schematic cross-sectional illustration of part of a foundation pile according to a twelfth embodiment of the present invention, in which the stabilization device is designed as a stabilization ring of double-T-shaped cross section.

FIG. 11C shows a schematic cross-sectional illustration of part of a foundation pile 10 in accordance with a twelfth embodiment of the present invention, in which the stabilization device 30 is designed as a stabilization ring 39_3 of double-T-shaped cross section. Stabilization ring 39_3 is connected over the entire outer circumference thereof to the inner surface 11 of the foundation pile 10. Stabilization ring 39_3 covers an angle of 360°.

LIST OF REFERENCE SIGNS 10 foundation pile
11 inner surface section (of the foundation pile)
12 longitudinal axis (of the foundation pile)
13 end edge (of the foundation pile)
14 through opening (in the foundation pile)
20 foundation pile segment
21 longitudinal edge/edge of plate/edge of material (of the foundation pile segment)
23 end edge (of the foundation pile segment)
24 partial-cylinder segment (of the foundation pile segment)
30 stabilization device
31-38 stabilization strut
39_1 stabilization ring
39_2 stabilization ring (of T-shaped cross section)
39_3 stabilization ring (of double-T-shaped cross section)
40 connecting device
41 receptacle/receiving bush/bush (of the connecting device)
50 fastening device/fastening plate
B foundation/seabed

The invention claimed is:

1. A foundation pile (10), comprising:
a stabilization device (30; 31-38, 39_1, 39_2, 39_3) arranged within the foundation pile (10) and connected to at least two inner surface sections (11) of the foundation pile (10), wherein compressive and/or tensile forces can be transmitted by means of the stabilization device (30; 31-38, 39_1, 39_2, 39_3) configured to distribute wind, wave or tidal force within the foundation pile (10) when anchored in the seabed to provide a lateral stiffness and/or torsional stiffness of the foundation pile (10); and
wherein the stabilization device (30; 31-38) comprises at least two connected stabilization struts (31-38), two opposite ends of which are connected to two inner surface sections (11) of the foundation pile (10).

2. The foundation pile (10) of claim 1, wherein the stabilization device (30; 31-38, 39_1, 39_2, 39_3) comprises a stabilization ring (39_1, 39_2, 39_3) arranged within the foundation pile (10) and connected to at least two inner surface sections (11) of the foundation pile (10).

3. The foundation pile (10) of claim 1, wherein
the stabilization device (30; 31-38) comprises at least two stabilization struts (31-38), components of extent of which do not extend parallel to one another, at least in some section or sections; and
respective ends of the stabilization struts (31-38) are each connected to one inner surface section (11) of the foundation pile (10).

4. The foundation pile (10) of claim 1, wherein
the stabilization device (30; 31-38) comprises at least three stabilization struts (31-38), respective pairs of components of extent of which do not extend parallel to one another; and
respective ends of the stabilization struts (31-38) are each connected to one inner surface section (11) of the foundation pile (10).

5. The foundation pile (10) of claim 1, wherein
the stabilization device (30; 31-38) comprises four stabilization struts (31-38), respective pairs of which do not extend parallel to one another; and
a first stabilization strut (31-38) and a second stabilization strut (31-38) define a first plane, and a third stabilization strut (31-38) and a fourth stabilization strut (31-38) define a second plane, wherein the first plane and the second plane enclose an angle.

6. The foundation pile (10) of claim 1, wherein the stabilization struts (31-38) are connected to one another.

7. The foundation pile (10) of claim 1, wherein the stabilization device (30; 31-38) comprises eight stabilization struts (31-38); wherein two of the stabilization struts (31-38) in each case extend axially offset and in a collinear manner relative to one another, thus forming four stabilization strut pairs which do not extend parallel to one another;

a first stabilization strut pair and a second stabilization strut pair define a first plane, and a third stabilization strut pair and a fourth stabilization strut pair define a second plane, wherein the first plane encloses an angle with the second plane; and the foundation pile (10) furthermore comprises a connecting device (40) for connecting the stabilization struts (31-38), wherein the connecting device (40) has eight receptacles (41) for respectively accepting one end of a stabilization strut (31-38), wherein the axial extents of two receptacles (41) in each case extend parallel to one another.

8. The foundation pile (10) of claim 1, further comprising at least two foundation pile segments (20), wherein longitudinal axes of the respective foundation pile segments (20) extend in a substantially collinear manner relative to one another.

9. The foundation pile (10) of claim 8, wherein the two foundation pile segments (20) are connected to one another by means of the stabilization device (30; 31-38, 39_1, 39_2, 39_3).

10. The foundation pile (10) of claim 8, wherein the foundation pile segments (20) are each formed by at least two partial-cylinder segments (24) connected to one another by means of the stabilization device (30; 31-38, 39_1, 39_2, 39_3).

11. The foundation pile (10) of claim 10, wherein longitudinal edges (21) of the mutually adjacent partial-cylinder segments (24) of the foundation pile segment (10) are spaced apart, with the result that the foundation pile (10) has through openings (14) between these longitudinal edges (21) of the partial-cylinder segments (24).

12. The foundation pile (10) of claim 1, further comprising fastening devices (50) arranged on the inside of the foundation pile (10), wherein the stabilization device (30) is fastened on the fastening devices (50).

* * * * *